J. Murdock.
Bird House.
No. 88,799.      Patented Apr. 13, 1869.
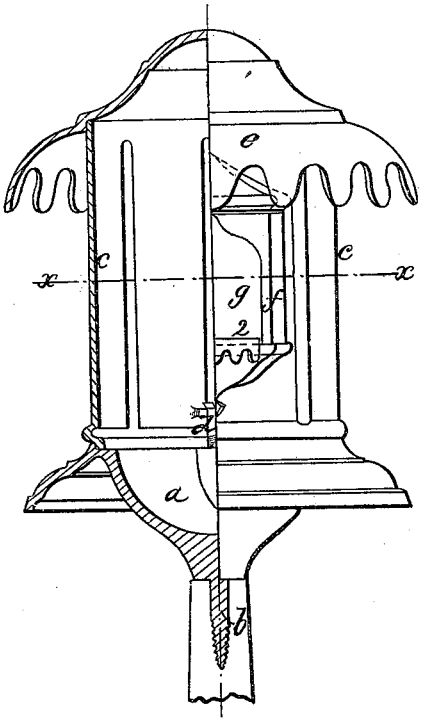
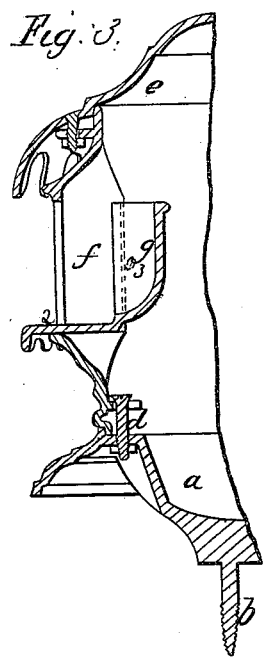
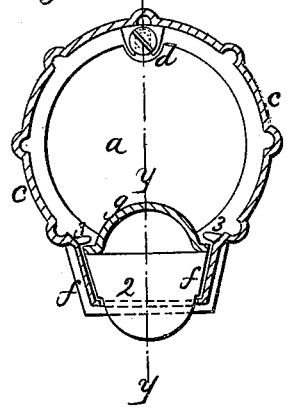
Witnesses;
Chas. H. Smith
Geo. T. Pinckney
Inventor;
John Murdock
per L. W. Serrell
atty

United States Patent Office.

JOHN MURDOCK, OF JERSEY CITY, NEW JERSEY, ASSIGNOR TO JOHN SAVERY'S SONS, OF NEW YORK CITY.

*Letters Patent No. 88,799, dated April 13, 1869.*

IMPROVEMENT IN METAL BIRD-HOUSES.

The Schedule referred to in these Letters Patent and making part of the same

*To all whom it may concern:*

Be it known that I, JOHN MURDOCK, of Jersey City, in the county of Hudson, and State of New Jersey, have invented and made a new and useful Improvement in Bird-Houses; and I do hereby declare the following to be a full, clear, and exact description of the said invention, reference being had to the annexed drawing, making part of this specification, wherein—

Figure 1 is a view, showing half of said bird-house in section, and the other half in elevation;

Figure 2 is a sectional plan at the line $x\,x$; and

Figure 3 is a vertical section at the line $y\,y$.

Similar marks of reference denote the same parts.

The object of this invention is to furnish a neat and durable bird-house, that is adapted to small birds, such as sparrows, and is perfectly safe from the attacks of cats, hawks, &c., and said house is constructed so that it can be easily opened for cleaning when desired.

In the drawing, $a$ represents the base of the bird-house, which is concave, so as to be adapted to receiving the nest.

This base may have in the bottom a screw, $b$, by means of which the house may be attached to the top of a post, or other convenient article.

The sides of the house are formed of the cylindrical portion $c$, united to the base $a$, by the screws $d$, and $e$ is a roof, or top of an ornamental character, and projecting sufficiently to shed the rain.

In one side of the house is an opening, surrounded by a flange, $f$, said flange forming a protection around said opening, and within this opening is the movable shield $g$, having a base-flange, 2, and setting in front of the lugs 3 3, that are cast upon the inner angles of the opening, into which said shield is slipped.

The base-flange 2 causes any rain to pass outside the flange $f$, and the shield $g$ is of a height to allow sufficient opening for small birds to pass in over its upper end; but this shield and the flange $f$ prevent cats or birds of prey from getting at the birds in the house.

The shield and flange may be applied on two or more sides of the bird-house, and the interior portion of said house may be subdivided.

When the house is to be cleaned out, the shield $g$ can be slipped up until above the lugs 3, and then turned around and taken out. The reverse movement replaces the shield.

What I claim, and desire to secure by Letters Patent, is—

The flange $f$ and movable shield $g$, constructed as specified, and applied to the opening of the bird-house, for the purposes set forth.

In witness whereof, I have hereunto set my signature, this 27th day of February, A. D. 1869.

JOHN MURDOCK.

Witnesses:
GEO. D. WALKER,
GEO. T. PINCKNEY.